United States Patent
Yap (10) Patent No.: US 9,066,616 B2
(45) Date of Patent: Jun. 30, 2015

(54) CONNECTOR ASSEMBLY FOR PORTABLE HANGER

(75) Inventor: Kalika Yap, Santa Monica, CA (US)

(73) Assignee: LUXE LINK, LLC, Santa Monica, CA (US)

(*) Notice: Subject to any disclaimer, the term of this patent is extended or adjusted under 35 U.S.C. 154(b) by 517 days.

(21) Appl. No.: 12/975,158

(22) Filed: Dec. 21, 2010

(65) Prior Publication Data

US 2012/0155955 A1 Jun. 21, 2012

(51) Int. Cl.
*A45C 13/00* (2006.01)
*F16B 7/22* (2006.01)
*A47G 29/08* (2006.01)
*A45C 13/10* (2006.01)
*A45C 13/30* (2006.01)

(52) U.S. Cl.
CPC ............ *A47G 29/083* (2013.01); *Y10T 403/53* (2015.01); *F16B 7/22* (2013.01); *Y10T 403/595* (2015.01); *Y10T 403/608* (2015.01); *Y10T 403/599* (2015.01); *A45C 13/1092* (2013.01); *A45C 13/30* (2013.01); *A47G 2200/106* (2013.01)

(58) Field of Classification Search
CPC ........... A45C 13/1076; A45C 13/1084; A45C 13/192; A45C 13/30; A45C 2001/022; A45C 2013/1007; A45C 2013/1015; A45C 13/1092; A45F 2005/006; F16B 7/22
USPC .............. 403/289, 376, 322, 322.4, 325, 330, 403/322.1; 248/682, 693, 914; 224/271, 224/583, 600, 605, 677; 24/3.12, 3.13, 3.4, 24/265 BC, 265 EC, 633, 636, 643
See application file for complete search history.

(56) References Cited

U.S. PATENT DOCUMENTS

| | | | |
|---|---|---|---|
| 2,516,760 A | 7/1950 | Doran | |
| 2,521,037 A | 9/1950 | Brinton | |
| 3,630,475 A | 12/1971 | Barry | |
| 3,767,152 A | 10/1973 | Killinger | |
| 3,789,467 A * | 2/1974 | Aratani et al. | 24/648 |
| 3,944,153 A * | 3/1976 | Linker | 403/330 |
| 4,873,750 A | 10/1989 | Tracy | |
| 4,893,383 A * | 1/1990 | Quickel | 24/648 |
| 4,924,562 A * | 5/1990 | Pogharian | 24/664 |
| 5,027,477 A | 7/1991 | Seron | |
| 5,279,021 A * | 1/1994 | Edgin | 24/647 |

(Continued)

*Primary Examiner* — Josh Skroupa
(74) *Attorney, Agent, or Firm* — James P. Broder; Roeder & Broder LLP (57) ABSTRACT

A connector assembly (18) for detachably connecting a portable hanger (14) to a portable hanger holder (16) includes a first connector member (342) and a second connector member (344). The first connector member (342) is coupled to the portable hanger holder (16) and the second connector member (344) is coupled to the portable hanger (14). The second connector member (344) detachably engages the first connector member (342) to detachably secure the portable hanger (14) to the portable hanger holder (16). The first connector member (342) can include a latch member (348) and the second connector member (344) can include a latch receiver (360) that receives the latch member (348). The first connector member (342) can further include a first connector base (346). Additionally, the latch member (348) can be pivotally connected to the first connector base (346) so that the latch member (348) pivots relative to the first connector base (346) between an engaged position wherein the latch receiver (360) retains the latch member (348) and a disengaged position wherein the latch receiver (360) does not retain the latch member (348).

24 Claims, 3 Drawing Sheets

(56) References Cited

U.S. PATENT DOCUMENTS

| | | | |
|---|---|---|---|
| 5,425,485 A * | 6/1995 | Carlo | 224/617 |
| 5,832,573 A * | 11/1998 | Howell | 24/664 |
| 5,893,498 A * | 4/1999 | Aronson | 24/3.12 |
| 6,273,376 B1 * | 8/2001 | Montgomery | 248/214 |
| 6,301,757 B1 * | 10/2001 | Kunii et al. | 24/636 |
| 6,405,908 B2 * | 6/2002 | Hood et al. | 24/265 BC |
| 6,481,069 B1 * | 11/2002 | Cheng | 24/647 |
| 6,598,273 B2 * | 7/2003 | Buettell | 24/3.12 |
| 6,769,270 B2 * | 8/2004 | Takessian | 24/3.4 |
| 6,804,867 B2 | 10/2004 | Oda et al. | |
| 7,350,277 B1 * | 4/2008 | Canfield et al. | 24/637 |
| 7,574,783 B2 | 8/2009 | Muratsubaki et al. | |
| 7,661,644 B1 * | 2/2010 | Yen | 248/914 |
| 7,877,844 B2 * | 2/2011 | Nichols et al. | 24/3.12 |
| 8,371,546 B2 * | 2/2013 | Bauerly | 248/914 |
| 8,572,820 B2 * | 11/2013 | Richards | 24/648 |
| 2003/0066171 A1 * | 4/2003 | Terzian | 24/647 |
| 2007/0277352 A1 | 12/2007 | Maron et al. | |
| 2008/0042032 A1 * | 2/2008 | Yap et al. | 248/914 |
| 2008/0115396 A1 * | 5/2008 | Gamboa | 40/661 |
| 2009/0133229 A1 * | 5/2009 | Kogen | 24/303 |

* cited by examiner

CONNECTOR ASSEMBLY FOR PORTABLE HANGER

BACKGROUND

The popularity of portable hangers for hanging an item such as a purse from a table or other surface has increased dramatically in recent years. As people continue to recognize the need or desire to keep such items close by and free from germs, bacteria, or other materials that may contact such items if they are placed on a floor or the ground, such popularity is likely to increase even more.

Unfortunately, a problem may exist in that sometimes such portable hangers are hard to find when you really need them, because they can tend to get buried in the bottom of a purse, backpack, bag or other item. Moreover, previous attempts to solve this problem have included attachment mechanisms that can be cumbersome, complex, and/or inconvenient to use.

SUMMARY

The present invention is directed toward a connector assembly for detachably connecting a portable hanger to a portable hanger holder. The portable hanger holder is detachably attached to an object, and the portable hanger is adapted to hang the object from a surface. In certain embodiments, the connector assembly comprises a first connector member and a second connector member. The first connector member is coupled to the portable hanger holder and the second connector member is coupled to the portable hanger. The second connector member detachably engages the first connector member to detachably secure the portable hanger to the portable hanger holder.

Additionally, in certain embodiments, the first connector member and the second connector member are movable relative to one another between a connected position wherein the first connector member is coupled to the second connector member, and a disconnected position wherein the first connector member is not coupled to the second connector member. In one such embodiment, when the connector members are in the connected position, a portion of the second connector member is positioned and retained substantially within at least a portion of the first connector member. In another such embodiment, when the connector members are in the connected position, a portion of the first connector member is positioned and retained substantially within at least a portion of the second connector member.

Further, in some embodiments, the first connector member includes a latch member and the second connector member includes a latch receiver that receives the latch member to detachably engage the first connector member and the second connector member. Moreover, in certain embodiments, the first connector member further includes a first connector base. In one such embodiment, the latch member can be pivotally connected to the first connector base so that the latch member pivots relative to the first connector base between an engaged position wherein the latch receiver retains the latch member and a disengaged position wherein the latch receiver does not retain the latch member. Further, the latch member can be biased toward the engaged position.

Additionally, in one embodiment, the first connector member includes a first connector base having a top aperture. In such embodiment, at least a portion of the latch member extends through the top aperture.

The present invention is also directed to a portable hanger assembly including a portable hanger, a portable hanger holder, and the connector assembly as described above that detachably connects the portable hanger to the portable hanger holder.

The present invention is further directed toward a method for detachably connecting a portable hanger to a portable hanger holder.

BRIEF DESCRIPTION OF THE DRAWINGS

The accompanying drawings illustrate the present invention. In such drawings.

DETAILED DESCRIPTION OF THE INVENTION

Figure 1A:
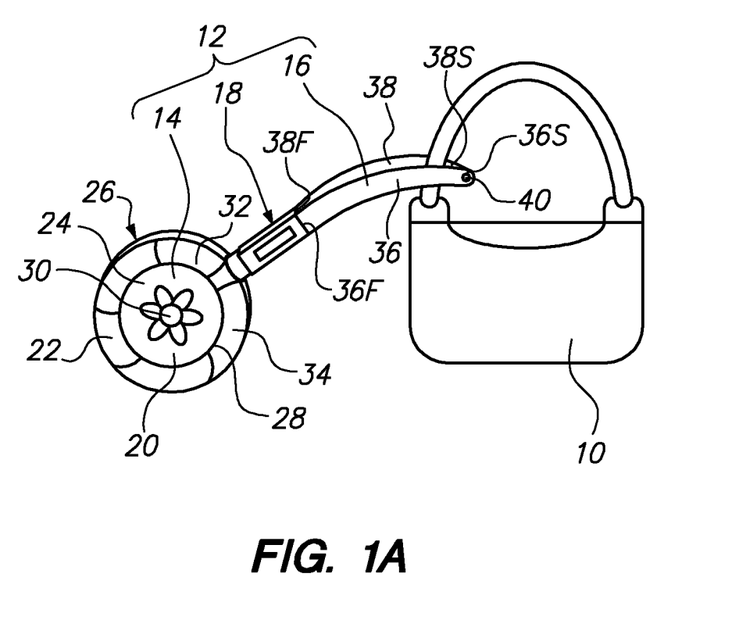
FIG. 1A is a perspective view of a purse and an embodiment of a portable hanger assembly having features of the present invention, the portable hanger assembly being illustrated in an attached configuration.
Figure 1B:
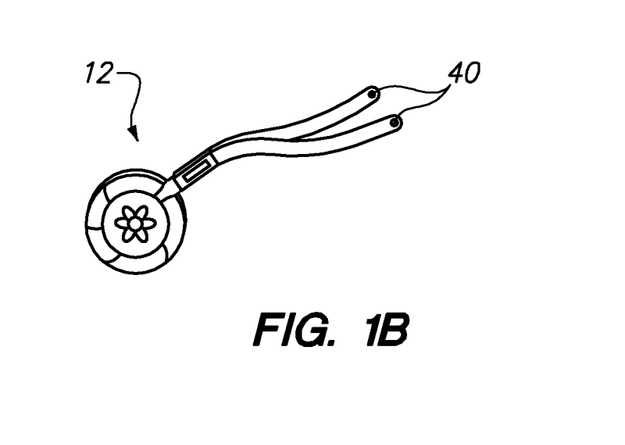
FIG. 1B is a perspective view of the portable hanger assembly illustrated in FIG. 1A, the portable hanger assembly being illustrated in a detached configuration.
Figure 2:
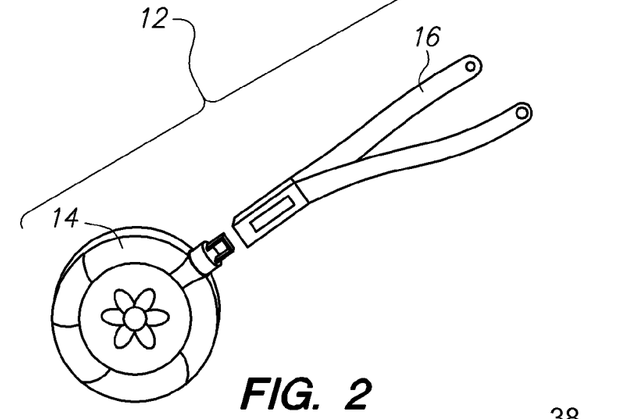
FIG. 2 is a partially exploded perspective view of the portable hanger assembly illustrated in FIG. 1A.

FIG. 1A is a perspective view of an object or article (such as a purse 10 as illustrated in FIG. 1A) and an embodiment of a portable hanger assembly 12 having features of the present invention. The features depicted in FIG. 1A are not necessarily illustrated to scale so that certain features of the invention can be better shown. In some embodiments, the portable hanger assembly 12 is selectively movable between an attached configuration, as illustrated in FIG. 1A, and a detached configuration, as illustrated in FIG. 1B. Additionally, as described in greater detail herein, the portable hanger assembly 12 is selectively movable between a connected position, as illustrated in FIG. 1A, and a disconnected position, as illustrated in FIG. 2.

The design of the portable hanger assembly 12 can be varied. As illustrated in FIG. 1A, the portable hanger assembly 12 can include a portable hanger 14, a portable hanger holder 16, and a connector assembly 18. Further, as noted above, in FIG. 1A, the portable hanger assembly 12 is illustrated in the attached configuration wherein the portable hanger assembly 12 is attached to the purse 10.

As illustrated herein, the portable hanger assembly 12 can be detachably secured or otherwise coupled to the purse 10, and the portable hanger 14 can be utilized for hanging an article, such as the purse 10, from a table, countertop, bar or any other suitable surface. Of course, the portable hanger assembly 12 can be attached to another object, such as a backpack, a bag or the like, and the portable hanger 14 can be utilized for supporting other types of articles, such as coats, hats, helmets, umbrellas, shopping bags, etc., and such alternatives should be considered within the scope of the claimed invention.

The design of the portable hanger 14 can be varied. For example, in certain embodiments, the portable hanger 14 can be substantially similar to that described in U.S. Pat. No. 7,644,900 as issued to Yap et al. on Jan. 12, 2010, and entitled "Portable Hanger for Purse". As far as is permitted, the contents of U.S. Pat. No. 7,644,900 are incorporated herein by reference. Alternatively, the portable hanger 14 can have a different design provided the portable hanger 14 is adapted to hang an object relative to a surface.

In one embodiment, as illustrated in FIG. 1A, the portable hanger 14 can include a base 20 and a plurality of links 22 that are coupled to the base 20. As shown, the base 20 can be generally disk-shaped and can include a top surface 24, a generally planar bottom surface 26 opposite the top surface 24, and a perimeter 28 connecting the top surface 24 and the bottom surface 26. Alternatively, the base 20 can have a different shape, and all such alternative shapes should be considered within the scope of the present invention. Further, the base 20 may be constructed of any suitable material, including plastic for less expensive embodiments, metal for more expensive embodiments, and potentially even precious metals for the most expensive embodiments.

As shown, the top surface 24 includes a decorative indicia 30. However, in different embodiments the top surface 24 may include a variety of decorative shapes, indicia, and features, or the top surface 24 can include no shapes, indicia, or features.

Additionally, in this embodiment, the bottom surface 26 is adapted to rest upon and frictionally engage a table (not illustrated) or other surface. For example, the bottom surface 26 may include a non-skid coating (not illustrated) such as rubber, or a textured surface, for enhancing the frictional engagement between the bottom surface 26 and the table or other surface.

The plurality of links 22 are coupled to the base 20 and are pivotally linked to each other in series to form a chain having a first link 32 and a last link 34. For example, in one embodiment, the first link 32 can be coupled to the perimeter 28 of the base 20, and the others of the plurality of links 22 can be linked consecutively to the first link 32. Additionally, in one embodiment, the plurality of links 22 can be adapted to move between a stored configuration (as illustrated in FIG. 1A) in which the plurality of links 22 are positioned generally adjacent the perimeter 28 of the base 20, and an operative configuration (not illustrated) in which the plurality of links 22 form a support structure (not illustrated), such as a hook, such that the purse 12 or other object may be hung upon the hook when the base 20 is positioned on the table or surface.

In this embodiment, the last link 34 of the plurality of links 22 can be curved for forming the hook so as to engage a portion of the purse 12, e.g., the purse strap, when the plurality of links 22 are in the operative configuration. In one embodiment, some or all of the plurality of links 22 are curved for forming the hook. In alternate embodiments, one or more of the plurality of links 30 can have other configurations and or geometries.

In certain embodiments, the portable hanger 14 may further include a locking means (not illustrated) for locking the plurality of links 22 in the stored configuration. For example, in one such embodiment, the portable hanger 14 may include one or more magnets for locking the plurality of links 22 in the stored configuration. Alternatively, the portable hanger 14 can include a different type of locking means, or the locking means can be omitted.

The design of the portable hanger holder 16 can be varied to suit the requirements of the portable hanger assembly 12. As shown in the embodiment illustrated in FIG. 1A, the portable hanger holder 16 can include a first strap 36, a second strap 38, and an attachment mechanism 40.

In this embodiment, the first strap 36 is secured to the connector assembly 18 and extends away from the connector assembly 18. Stated another way, the first strap 36 includes a first strap end 36F that is secured to the connector assembly 18 and a second strap end 36S that is positioned away from the connector assembly 18. Somewhat similarly, the second strap 38 is secured to the connector assembly 18 and extends away from the connector assembly 18. Stated another way, the second strap 38 includes a first strap end 38F that is secured to the connector assembly 18 and a second strap end 38S that is positioned away from the connector assembly 18.

In one embodiment, each of the straps 36, 38 can be made from leather. Alternatively, each of the straps 36, 38 can be made of a different material, such as vinyl or another material.

In this embodiment, the attachment mechanism 40 detachably attaches the second strap end 36S of the first strap 36 to the second strap end 38S of the second strap 38. With this design, the portable hanger assembly 12 can be quickly and easily attached to and detached from a purse strap or the like. In one embodiment, the attachment mechanism 40 includes a snap, wherein one portion of the snap is secured at or near the second strap end 36S of the first strap 36 and another portion of the snap is secured at or near the second strap end 38S of the second strap 38.

In non-exclusive alternative embodiments, the attachment mechanism 40 can include one or more magnets or a hook and loop-type attachment that secures the portable hanger holder 16 to the purse 10 or other object. Still alternatively, the attachment mechanism 40 can have a different design and/or can selectively attach the first strap 36 and the second strap 38 together in a different manner or in a different position. In another embodiment, the portable hanger holder 16 can omit the attachment mechanism 40 and the portable hanger holder 16 can be at least semi-permanently or permanently attached to the purse 10 or other object. In yet another embodiment, the portable hanger holder 16 can include a single strap (not shown) having an attachment mechanism that secures one portion of the strap to another portion of the strap.

As will be described in greater detail herein below, the connector assembly 18 selectively connects and disconnects the portable hanger 14 and the portable hanger holder 16. Stated another way, the connector assembly 18 detachably connects the portable hanger 14 and the portable hanger holder 16 so that the portable hanger assembly 12 is selectively movable between the connected position and the disconnected position.

It should be noted that the portable hanger assembly 12 can be maintained in the attached configuration (illustrated in FIG. 1A) or the detached configuration (illustrated in FIG. 1B) regardless of whether the portable hanger assembly 12 is in the connected position (illustrated in FIG. 1A) or the disconnected position (illustrated in FIG. 2). Stated another way, the portable hanger assembly 12 can be maintained in the attached configuration while the connector assembly 18 is utilized to move the portable hanger assembly 12 between the connected position and the disconnected position. With this design, the portable hanger holder 16 can still be attached to the purse strap or the like while portable hanger 14 is being utilized for supporting the purse 10 or other object from the table or other surface. Moreover, the portable hanger 14 can then quickly and easily be reattached to the purse 10 or other object, i.e. moved into the attached configuration, when the portable hanger 14 is no longer being utilized for supporting the purse 10 or other object from the table or other surface. Additionally, the unique design of the portable hanger assembly 12, as described herein, enables the user to easily find and use the portable hanger 14 when needed.

FIG. 1B is a perspective view of the portable hanger assembly 12 illustrated in FIG. 1A, wherein the portable hanger assembly 12 is in the detached configuration. In particular, FIG. 1B illustrates that the attachment mechanism 40 can be disengaged such that the portable hanger assembly 12 is in the detached configuration relative to the purse 10 (illustrated in FIG. 1A). In the detached configuration, the portable hanger assembly 12 can be quickly and easily removed from or otherwise moved away from the purse 10 or other object.

FIG. 2 is a partially exploded perspective view of the embodiment of the portable hanger assembly 12 illustrated in FIG. 1A. In particular, FIG. 2 illustrates the portable hanger assembly 12 in the disconnected position, wherein the portable hanger 14 and the portable hanger holder 16 are not connected together.

Figure 3A:
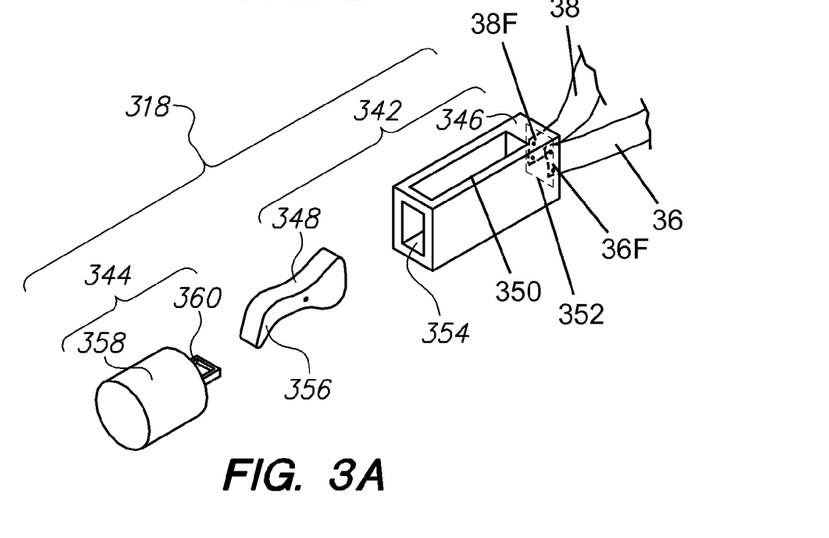
FIG. 3A is an exploded perspective view of a portion of the portable hanger assembly illustrated in FIG. 1A.

FIG. 3A is an exploded perspective view of a portion of the portable hanger assembly 12 illustrated in FIG. 1A. In particular, FIG. 3A is an exploded perspective view of an embodiment of the connector assembly 318.

The design of the connector assembly 318 can be varied to suit the specific requirements of the portable hanger assembly 318. In the embodiment illustrated in FIG. 3A, the connector assembly 318 includes a first connector member 342 and a second connector member 344. The second connector member 344 can detachably engage the first connector member 342 so that the portable hanger assembly 12, and thus the connector assembly 318, can move between the disconnected position, as illustrated in FIG. 3B, and the connected position, as illustrated in FIG. 3C.

Figure 3B:
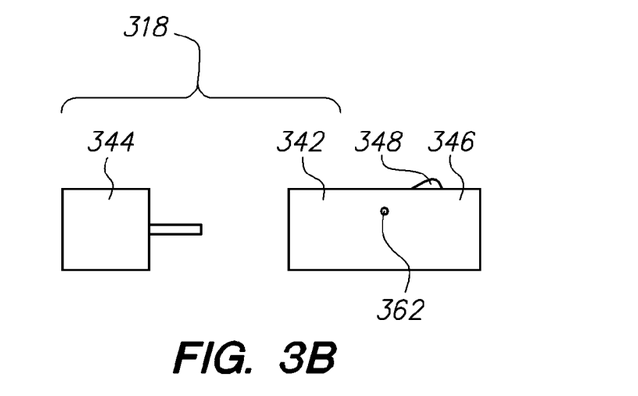
FIG. 3B is a partially exploded side view of the portion of the portable hanger assembly illustrated in FIG. 3A.
Figure 3C:
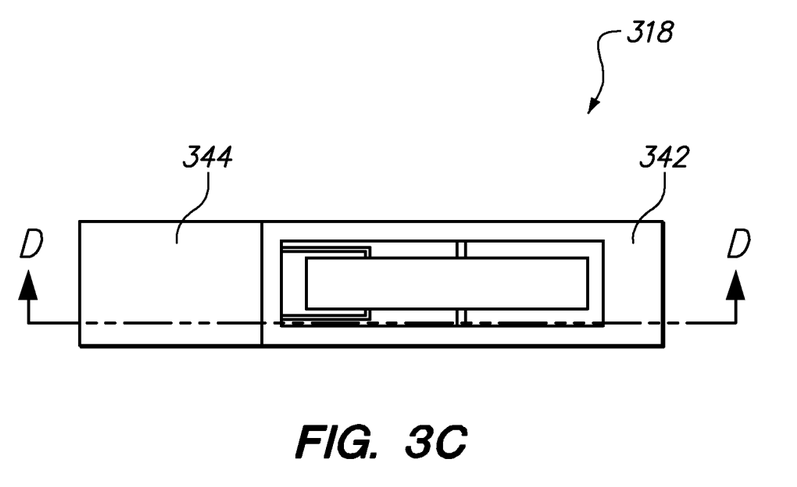
FIG. 3C is a top view of the portion of the portable hanger assembly illustrated in FIG. 3A.

In this embodiment, the first connector member 342 is coupled to the portable hanger holder 16 (illustrated in FIG. 1A) and includes a first connector base 346 and a latch member 348, which, as illustrated in FIG. 3B, is pivotally coupled to the first connector base 346. Alternatively, the first connector member 342 can be coupled to the portable hanger 14 and/or the first connector member 342 can have a different design.

As illustrated in FIG. 3A, the first connector base 346 is a substantially rectangular shaped shell and includes a top aperture 350, a first end aperture 352 (illustrated in phantom), and a second end aperture 354. The shell shaped design and the top aperture 350 enable the latch member 348 to be positioned at least partially within the shell of the first connector base 346 and extend through and/or provide access to the latch member 348 for the user through the top aperture 350. Stated another way, at least a portion of the latch member 348 can extend through the top aperture 350 to allow the user to access and manipulate the latch member 348. In one embodiment, the top aperture 350 is substantially rectangle shaped. In alternative embodiments, the first connector base 346 can have a different design and/or have a different shape, configuration or geometry. Still alternatively, the top aperture 350 can also have a different shape or relative size than that illustrated in FIG. 3A.

In one embodiment, the first end aperture 352 is substantially square shaped and is designed to receive a portion of the portable hanger holder 16. For example, a portion of the first strap 36 (also illustrated in FIG. 1A), i.e. the first strap end 36F (also illustrated in FIG. 1A) of the first strap 36, and a portion of the second strap 38 (also illustrated in FIG. 1A), i.e. the first strap end 38F (also illustrated in FIG. 1A) of the second strap 38, extend through the first end aperture 352, and the straps 36, 38 can thus be secured to the first connector base 346 of the first connector member 342. In one embodiment, the straps 36, 38 can be secured to the first connector member 342 with one or more screws. In certain alternative embodiments, the first end aperture 352 can have a different shape and/or the portable hanger holder 16 can be secured to the first connector member 342 in a different manner.

As illustrated, the second end aperture 354 can be substantially rectangle shaped and is adapted to receive a portion of the second connector member 344. Stated another way, a portion of the second connector member 344 is adapted to extend into and/or through the second end aperture 354 and be selectively retained within the shell of the first connector base 346 of the first connector member 342. Stated still another way, a portion of the second connector member 344 can be positioned substantially within at least a portion of the first connector member 342. Alternatively, the second end aperture 354 can have a different shape.

It should be noted that the use of the terms "first end aperture" and "second end aperture" is merely for ease of description, and either end aperture 352, 354 can be described as the "first end aperture" or the "second end aperture".

As shown in FIG. 3A, the latch member 348 can be somewhat rectangle shaped with a curved or wave-like profile and the latch member 348 can have a hook member 356 located near an end of the latch member 348. With this design, the latch member 348, via the hook member 356, can detachably engage a portion of the second connector member 344 so that the connector assembly 318 and thus the portable hanger assembly 12 can be selectively maintained in the connected position. Alternatively, the latch member 348 can have a different design and/or a different shape.

The first connector member 342, i.e. the first connector base 346 and the latch member 348, can be made of any suitable material such as metal, composite materials, glass, ceramic or plastic, as non-exclusive examples. Alternatively, the first connector base 346 and the latch member 348 can be made of different materials.

In this embodiment, the second connector member 344 is coupled to the portable hanger 14 (illustrated in FIG. 1A) and includes a second connector base 358 and a latch receiver 360 that extends away from the second connector base 358. Alternatively, the second connector member 344 can be coupled to the portable hanger holder 16 and/or the second connector member 344 can have a different design.

In one embodiment, the second connector base 358 can be substantially cylinder shaped and can be connected to the perimeter 28 (illustrated in FIG. 1A) of the portable hanger 14. For example, as shown in FIG. 1B, the second connector base 358 of the second connector member 344 can be directly connected to the perimeter 28 (illustrated in FIG. 1A) of the base 20 (illustrated in FIG. 1A) of the portable hanger 14. Alternatively, the second connector base 358 can have a different shape and/or the second connector base 358 can be connected to a different portion of the portable hanger 14.

As illustrated in FIG. 3A, the latch receiver 360 can be substantially U-shaped and can extend away from one end of the second connector base 358. With this design, the latch receiver 360 can extend into and/or through the second end aperture 354 of the first connector base 346, and the latch receiver 360 can selectively receive and retain the latch member 348, i.e. the hook member 356 portion of the latch member 348, of the first connector member 342. Stated another way, the latch member 348, i.e. the hook member 356 portion of the latch member 348, detachably engages the latch receiver 360 so that the connector assembly 318 and thus the portable hanger assembly 12 can be selectively maintained in the connected position. Alternatively, the latch receiver 360 can have a different design and/or a different shape.

The second connector member 344, i.e. the second connector base 358 and the latch receiver 360, can be made of any suitable material such as metal, composite materials, glass, ceramic or plastic, as non-exclusive examples. Alternatively, the second connector base 358 and the latch receiver 360 can be made of different materials.

It should be noted that the use of the terms "first connector member" and "second connector member" is merely for ease of description, and either connector member 342, 344 can be described as the "first connector member" or the "second connector member".

FIG. 3B is a partially exploded side view of the portion of the portable hanger assembly 12 illustrated in FIG. 3A. In particular, FIG. 3B is an exploded side view of the connector assembly 318 illustrated in FIG. 3A, wherein the portable hanger assembly 12, i.e. the connector assembly 318, is in the disconnected position. Stated another way, the first connector member 342 and the second connector member 344 are illustrated as being spaced apart from and/or removed from each other.

In this embodiment, the first connector member 342 further includes a pivot pin 362 that extends through the sides of the first connector base 346 and through the latch member 348 so as to enable the latch member 348 to pivot relative to the first connector base 346. Further, as shown in FIG. 3B, a portion of the latch member 348 of the first connector member 342 can extend outside the first connector base 346 so as to enable the user to easily access the latch member 348 and pivot the latch member 348 relative to the first connector base 346.

FIG. 3C is a top view of the portion of the portable hanger assembly 12 illustrated in FIG. 3A. In particular, FIG. 3C is a top view of the connector assembly 318 illustrated in FIG. 3A, wherein the portable hanger assembly 12, i.e. the connector assembly 318, is in the connected position. Stated another way, in FIG. 3C, the first connector member 342 engages the second connector member 344.

Figure 3D:
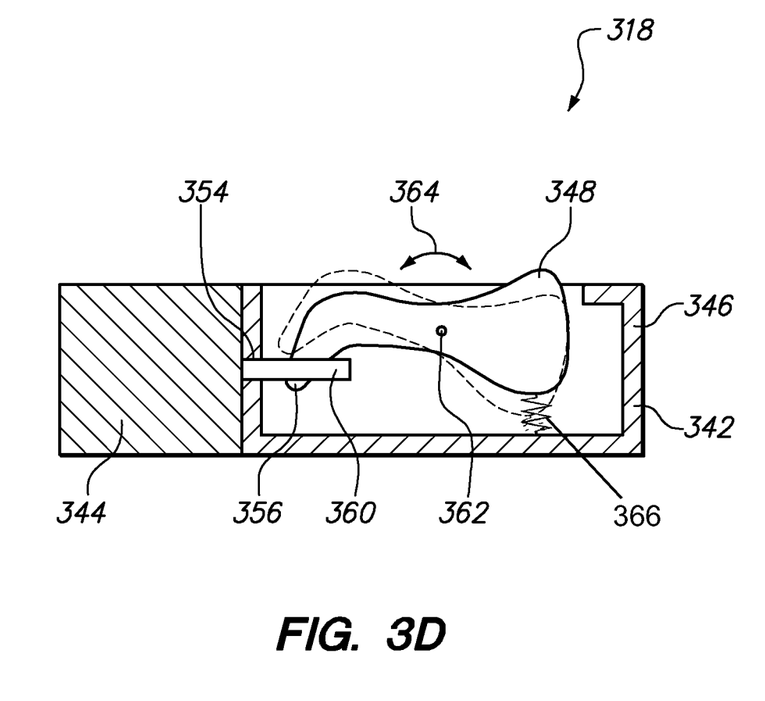
FIG. 3D is a sectional side view of the portion of the portable hanger assembly taken along line D-D in FIG. 3C.

FIG. 3D is a sectional side view of the portion of the portable hanger assembly 12 taken along line D-D in FIG. 3C. In particular, FIG. 3D is a sectional side view of the connector assembly 318 illustrated in FIG. 3A, wherein the portable hanger assembly 12, i.e. the connector assembly 318, is in the connected position.

In the embodiment illustrated in FIG. 3D, the latch member 348 can be pivoted about the pivot pin 362 relative to the first connector base 346, as demonstrated by arrow 364, such that the latch member 348 can move between an engaged position (the latch member 348 in solid lines) and a disengaged position (the latch member 348 in dashed lines). In the embodiment, when in the engaged position, the latch member 348 can be selectively retained by the latch receiver 360 such that the connector assembly 318 and the portable hanger assembly 312 can be maintained in the connected position. Further, in certain embodiments, when the latch member 348 is pivoted into the disengaged position, the second connector member 344, i.e. the latch receiver 360, can be quickly and easily inserted into and/or removed from the first connector base 346 of the first connector member 342. Stated another way, the latch member 348 is pivotally connected to the first connector base 346 so that the latch member 348 pivots relative to the first connector base 346 between the engaged position wherein the latch receiver 360 retains the latch member 348 and the disengaged position wherein the latch receiver 360 does not retain the latch member 348.

Additionally, in one embodiment, the latch member 348 is biased so that absent any manual manipulation of the latch member 348 by the user, the latch member 348 will stay in the engaged position. For example, in one embodiment, the latch member 348 can be spring loaded, i.e. with a spring 366 that biases the latch member 348 to stay in the engaged position. Alternatively, the latch member 348 can be biased using other mechanisms known to those skilled in the art. With this design, the connector assembly 318, and thus the portable hanger assembly 12, is better able to be maintained in the connected position. Further, in one embodiment, the latch receiver 360 can be inserted through the second end aperture 354 and into the first connector base 346 and the contact between the latch receiver 360 and the latch member 348 will move the latch member 348 from the engaged position to the disengaged position until such time as the bias of the latch member 348 causes the latch member 348 to move back to the engaged position with the hook member 356 positioned within and retained within the latch receiver 360.

Importantly, the embodiments of the portable hanger assembly 12 illustrated and described herein do not comprise the universe of portable hanger assemblies that can be utilized and incorporated into the present invention. For example, the portable hanger assembly 12 can be selectively attached to the purse or other object via magnetism, hook and loop means, buttons, or any other suitable manner, and is not limited to the attachment mechanism illustrated and described herein. Moreover, the connector assembly 18 can selectively connect the portable hanger and the portable hanger holder via mechanisms other than those illustrated and described herein. For instance, the connector assembly can connect the portable hanger and the portable hanger holder using magnetism, hook and loop means, snaps, buttons, or any other suitable manner.

While a number of exemplary aspects and embodiments of a portable hanger assembly 12 have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A portable hanger assembly for hanging an object from a surface, the portable hanger assembly comprising:
   a portable hanger including a base and a plurality of links that are coupled to the base, the base having a perimeter;
   a portable hanger holder that is detachably securable to the object; and
   a connector assembly that detachably connects the portable hanger to the portable hanger holder, the connector assembly including (i) a first connector member that is fixedly coupled to the portable hanger holder, the first connector member including a first connector base having a top aperture, and a latch member that is pivotally connected to the first connector base, and (ii) a second connector member that is directly connected to the perimeter of the base of the portable hanger, the second connector member including a latch receiver that receives the latch member to detachably secure the first connector member to the second connector member; wherein the latch member pivots relative to the first connector base between an engaged position wherein the latch receiver retains the latch member and a disengaged position wherein the latch receiver does not retain the latch member; wherein at least a portion of the latch member extends through the top aperture of the first connector base when the latch member is in the engaged position; wherein the first connector member can be fully disconnected from the second connector member when the latch member is in the disengaged position; and wherein relative movement between the latch member and the latch receiver is inhibited when the latch member is in the engaged position.

2. The portable hanger assembly of claim 1 wherein the latch member is biased toward the engaged position.

3. The portable hanger assembly of claim 1 wherein the first connector base includes a second aperture that receives a portion of the portable hanger holder.

4. The portable hanger assembly of claim 3 wherein the portable hanger holder includes a first strap having a first strap first end that extends through the second aperture.

5. The portable hanger assembly of claim 4 wherein the portable hanger holder further includes a second strap having a second strap first end that extends through the second aperture.

6. The portable hanger assembly of claim 5 wherein the portable hanger holder further includes an attachment mechanism that detachably attaches the first strap to the second strap to detachably secure the portable hanger holder to the object.

7. The portable hanger assembly of claim 1 wherein the first connector base includes a second aperture that receives a portion of the second connector member.

8. The portable hanger assembly of claim 7 wherein the latch receiver is selectively positionable to extend through the second aperture.

9. The portable hanger assembly of claim 1 wherein the latch member includes a hook member that detachably engages the latch receiver.

10. The portable hanger assembly of claim 9 wherein the latch receiver is substantially U-shaped, and wherein the latch receiver selectively receives and retains the hook member.

11. The portable hanger assembly of claim 1 wherein the second connector member includes a second connector base that is coupled to the portable hanger, and wherein the latch receiver extends away from the second connector base.

12. The portable hanger assembly of claim 1 wherein the first connector member further includes a pivot pin that extends through a first side and a second side of the first connector base and through the latch member to enable the latch member to pivot relative to the first connector base between the engaged position and the disengaged position.

13. A method for detachably connecting a portable hanger to an object, the portable hanger being adapted to hang the object relative to a surface, the method comprising the steps of:
   detachably securing a portable hanger holder to the object;
   coupling a first connector member to the portable hanger holder, the first connector member including a first connector base having a top aperture, and a latch member that is pivotally connected to the first connector base;
   providing the portable hanger including a base and a plurality of links that are coupled to the base;
   connecting a second connector member directly to a perimeter of the base of the portable hanger, the second connector member including a latch receiver that receives the latch member; and
   detachably securing the first connector member to the second connector member by pivoting the latch member relative to the first connector base between an engaged position wherein the latch receiver retains the latch member and a disengaged position wherein the latch receiver does not retain the latch member;
   wherein at least a portion of the latch member extends through the top aperture of the first connector base when the latch member is in the engaged position;
   wherein the first connector member can be fully disconnected from the second connector member when the latch member is in the disengaged position; and
   wherein relative movement between the latch member and the latch receiver is inhibited when the latch member is in the engaged position.

14. The method of claim 13 wherein the step of detachably securing the first connector member includes the latch member being biased toward the engaged position.

15. The method of claim 13 wherein the step of coupling the first connector member includes the first connector base having an end aperture that receives a portion of the portable hanger holder.

16. The method of claim 15 wherein the step of coupling the first connector member includes the step of extending a portion of a first strap of the portable hanger holder through the end aperture.

17. The method of claim 15 wherein the step of coupling the first connector member further includes the step of extending a portion of a second strap of the portable hanger holder through the end aperture.

18. The method of claim 17 wherein the step of detachably securing the portable hanger holder includes the step of detachably attaching the first strap to the second strap with an attachment means to detachably secure the portable hanger holder to the object.

19. The method of claim 13 wherein the step of detachably securing the first connector member includes the step of extending the latch receiver through an aperture of the first connector base.

20. The method of claim 13 wherein the step of detachably securing the first connector member includes the step of detachably engaging the latch receiver with a hook member of the latch member.

21. The method of claim 20 wherein the step of coupling the second connector member includes the latch receiver being substantially U-shaped; and wherein the step of detachably engaging the latch receiver includes the step of selectively receiving and retaining the hook member with the latch receiver.

22. The method of claim 13 wherein the step of coupling the second connector member includes the steps of coupling a second connector base of the second connector member to the portable hanger and extending the latch receiver away from the second connector base.

23. A portable hanger assembly for hanging an object from a surface, the portable hanger assembly comprising:
   a portable hanger including a base and a plurality of links that are coupled to the base, the base having a perimeter;
   a portable hanger holder that is detachably securable to the object; and
   a connector assembly that detachably connects the portable hanger to the portable hanger holder, the connector assembly including:
   a first connector member that is fixedly coupled to the portable hanger holder, the first connector member including (i) a first connector base having a top aperture, a first end aperture that receives a portion of the portable hanger holder, and a second end aperture, and (ii) a latch member that is pivotally connected to the first connector base; and
   a second connector member including (i) a second connector base that is directly connected to the perimeter of the base of the portable hanger, and (ii) a latch receiver that extends away from the second connector base, the latch receiver being selectively positionable to extend through the second end aperture and to selectively receive the latch member so as to detachably secure the first connector member to the second connector member;
   wherein the latch member pivots relative to the first connector base between an engaged position wherein the latch receiver retains the latch member and a disengaged position wherein the latch receiver does not retain the latch member;

wherein at least a portion of the latch member extends through the top aperture of the first connector base when the latch member is in the engaged position;

wherein the first connector member can be fully disconnected from the second connector member when the latch member is in the disengaged position; and wherein relative movement between the latch member and the latch receiver is inhibited when the latch member is in the engaged position.

24. The portable hanger assembly of claim 23 wherein the first connector member further includes a pivot pin that extends through a first side and a second side of the first connector base and through the latch member to enable the latch member to pivot relative to the first connector base between the engaged position and the disengaged position.

* * * * *